A. E. SMITH.
Attaching Hubs to Axles.
No. 16,661. Patented Feb. 17, 1857.
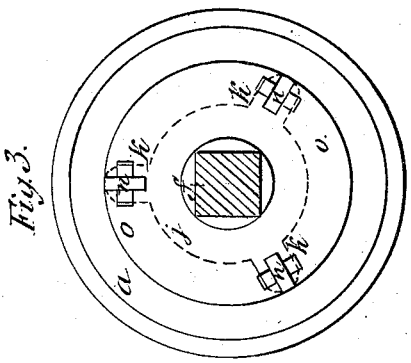
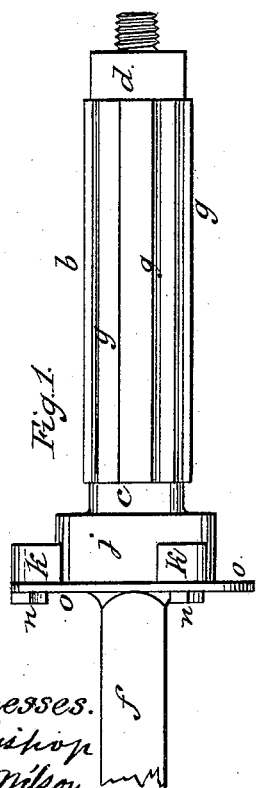
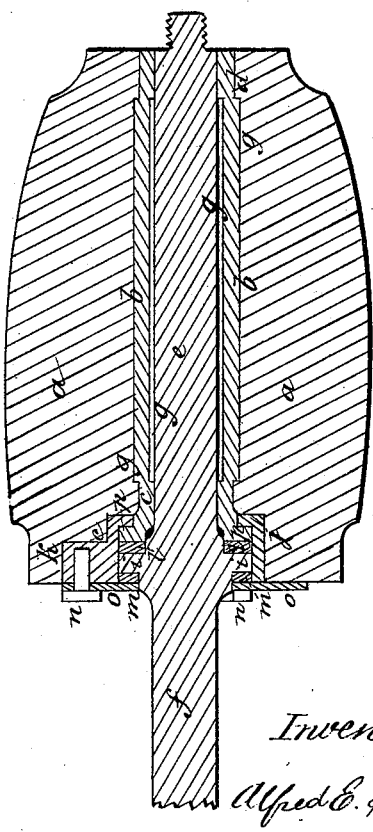
Witnesses.
Wm A Bishop
Joel B. Wilson
Inventor:
Alfred E. Smith

UNITED STATES PATENT OFFICE.

A. E. SMITH, OF BRONXVILLE, NEW YORK.

MODE OF SECURING HUBS ON AXLES.

Specification of Letters Patent No. 16,661, dated February 17, 1857.

*To all whom it may concern:*

Be it known that I, ALFRED E. SMITH, of Bronxville, Westchester county, and State of New York, have invented a new and useful Improvement in the Method of Securing Hubs on Carriage-Axles; and I do hereby declare that the following is a full, clear, and exact description thereof, reference being had to the accompanying drawings, making part of this specification, in which—

Figure 1 is an elevation or external view of the pipe box on the axle butt without the hub; Fig. 2, a longitudinal section of the same within the hub; and Fig. 3 a cross section of the axle representing the inner end of the hub.

The same letters indicate like parts in all the figures.

My said invention relates to the method of securing the pipe box and hub onto the arm of the axle, and consists in forming the inner end of the pipe box with a flanch fitted to enter a recess in a collar that is fitted and secured into the inner end of the hub, so that when the pipe box is driven into the hub the said collar shall embrace the flanch on the pipe box, when this is combined with a projecting collar on the axle which is embraced between the collar on the pipe box and a ring on the axle and fastened together by turn buttons, catches, keys, or equivalents therefor, so that the hub and pipe box will be free to turn on the axle without danger of getting off, while at the same time they can be readily taken off by simply disconnecting the ring on the axle and the collar on the pipe box.

In the accompanying drawings (*a*) represents the hub which is driven onto a metallic pipe box (*b*). The bore of this pipe box at the two ends (*c*) and (*d*) may be made to fit the arm (*e*) of the axle (*f*) accurately, but so that it will turn thereon freely. Between the ends (*c*) and (*d*) I prefer to corrugate or flute the pipe box so as to have the ribs and flutes (*g*) longitudinal, with the edges of the ribs inside to fit the arm of the axle, the grooves or flutes forming oil cells all around the arm of the axle, to keep and distribute the oil on the axle. The longitudinal ribs formed by the corrugations on the outside will enter the wood of the hub when it is driven onto the pipe box, which will have the effect thoroughly to bind and hold the pipe box within the hub. The inner end (*c*) of the pipe box is formed with a projecting flanch (*h*) of equal diameter with a collar (*i*) on the axle at the inner edge of the arm (*e*).

The inner end of the hub is cut out to fit a metallic collar (*j*) which is driven into this cavity, the collar being formed with projecting spurs (*k*) which aid in holding the collar within the cavity of the hub; but the collar may be otherwise secured within the end of the hub. The bore of the collar fits the outer diameter of the pipe box, and its inner face is bored out to extend over the flanch (*h*) of the pipe box and the collar (*i*) on the axle, and also leather washers (*l*, *m*) one on each side of the collar (*i*). The collar (*j*) is provided with three (more or less) turn buttons or hold fasts (*n*, *n*, *n*) tapped into it, and wtih flat projecting heads which pass through holes in a ring (*o*) which is fitted to turn freely on the axle beyond the collar (*i*) and with the leather washer (*m*) interposed between.

After the hub has been secured on the pipe box and slipped onto the axle the ring (*o*) is slipped over the head of the turn buttons which are then turned so that their projecting heads shall pass over the surface of the ring thereby firmly securing the ring (*o*) to the collar (*j*) and embracing the collar (*i*) on the axle, thereby securing the pipe box and hub on the axle in such a way that they cannot get off by accident although they can be readily put on and taken off. Catches or keys may be substituted for the turn buttons, although I prefer the turn buttons for the reason that in turning them to disconnect the parts they unscrew to free the parts, and in securing the ring to the collar they are screwed in to draw the parts firmly together to prevent all rattling, an important result in all vehicles. After the hub has been driven onto the pipe box the outer end can be further secured thereon by a nut or other suitable means.

What I claim as my invention and desire to secure by Letters Patent is—

The mode of securing the pipe box and hub onto the axle by forming the inner end of the pipe box with a flanch fitted to enter a recess in a collar fitted and secured into the inner end of the hub, substantially as described, when this is combined with a projecting collar on the axle, and a loose ring on the axle, the ring on the axle and the collar on the hub being connected by turn buttons, or equivalents therefor, substantially as and for the purpose specified.

ALFRED E. SMITH.

Witnesses:
 WM. H. BISHOP,
 JOEL B. WILSON.